United States Patent

Snider

[11] Patent Number: 5,535,813
[45] Date of Patent: Jul. 16, 1996

[54] OFFSET SUPPORT-PEDESTAL HOUSING PANEL

[75] Inventor: Rex R. Snider, Corfu, N.Y.

[73] Assignee: ABB Air Preheater, Inc., Wellsville, N.Y.

[21] Appl. No.: 450,495

[22] Filed: May 26, 1995

[51] Int. Cl.⁶ .................................................. F23L 15/02
[52] U.S. Cl. ........................................ 165/8; 165/4; 165/6
[58] Field of Search ........................................ 165/8, 6, 4

[56] References Cited

U.S. PATENT DOCUMENTS 3,802,489  4/1974  Kirchhoff et al. ............................ 165/4
4,418,742  12/1983  Conde et al. ................................ 165/8

FOREIGN PATENT DOCUMENTS 0225583  10/1986  Japan .......................................... 165/8

Primary Examiner—John Rivell
Assistant Examiner—Christopher Atkinson
Attorney, Agent, or Firm—Chilton, Alix & Van Kirk

[57] ABSTRACT

In an air preheater with a large lower cold end center section and a smaller, upper hot end center section, the connecting plate duct assemblies on both the hot and cold end are made the same height rather than to have cold end connecting plate duct assemblies which are larger and equal in height to the cold end center section. This minimizes the design and manufacturing costs and provides cold end connecting plate duct assemblies which are smaller, lighter and easier to handle. This then requires that the housing panels around the outside of the rotor be longer to reach between these connecting plate duct assemblies. At the ends of the hot and cold center sections are main support pedestal panels which support the hot end center section above the cold end center section. These main support pedestal panels together with the housing panels complete the rotor housing. In order to compensate for the difference in the height of the cold end center section and the hot end center section and the resulting difference in the distance between the hot and cold center section and between the hot and cold connecting plate duct assemblies, the main support pedestal panels include offsets which extend downwardly along the sides of the cold end center section to meet with the cold end connecting plate duct assemblies.

1 Claim, 3 Drawing Sheets

5,535,813

OFFSET SUPPORT-PEDESTAL HOUSING PANEL

BACKGROUND OF THE INVENTION

The present invention relates to rotary regenerative heat exchangers and more particularly to the configuration of the main support pedestal panels and remaining panels for the heat exchange housing so as to accommodate the same configuration connecting duct assemblies on both hot and cold ends of the heat exchange.

A rotary regenerative heat exchanger, conventionally used as an air preheater for combustion equipment, is composed of a rotor, containing heat exchange surface, which is mounted on a vertical shaft for rotation within a heat exchanger housing which surrounds the rotor. Extending across the heat exchanger on the lower end below the housing, normally the cold end, is a cold end center section which serves as a support for the entire heat exchanger structure including the rotor. Because the center section is required to rotatably support a very heavy rotor, it is of a significant vertical height. Extending across the top of the heat exchanger, above the housing and parallel to the cold end center section, is a hot end center section. This hot end center section functions as the mounting means for the upper end of the rotor shaft. Because the hot end center section need only support its' own weight, the height of the hot end center section is less than the height of the cold end center section by a factor of 2 or 3. The hot end center section is supported by main support pedestals on each end of the hot end center section which are, in turn, supported on the ends of the cold end center section.

The main support pedestal panels on each end of the hot and cold center sections form a part of the heat exchanger housing. The remainder of the housing comprises a plurality of housing panels arranged around the periphery of the rotor. Typically, there are eight or more sides including the main support pedestal panels and the remaining housing panels. Mounted on the inside of each housing panel including the main support pedestal panel between the panels and the rotor are arch-shaped stiffeners which cooperate to form a close fitting circular flange around the rotor. Conventional bypass sealing means are provided between the rotor and these arch-shaped stiffeners to prevent the by-pass of air or flue gas around the outside of the rotor.

Attached to each end of the heat exchanger housing are the air and gas connecting plate duct assemblies. These are connections which make the transition between the duct work, which is usually rectangular, and the circular heat exchanger and are attached to the sides of the hot and cold center sections. The housing panels are attached to and between these connecting plate duct assemblies thereby forming the housing.

The conventional arrangement is for the hot end connecting plate duct assemblies to be of a height equal, to the height of the hot end center section and for the cold end connecting plate duct assemblies to be of a height equal to the height of the cold end center section. In this arrangement, all of the housing panels including the main support pedestal panels are of the same height. Since the hot end center section and the cold end center section are of different heights, the height of the hot and cold end connecting plate duct assemblies are also different. This means that two different connecting plate duct assemblies must be designed and manufactured thereby increasing the costs. Also, the cold end connecting plate duct assemblies are significantly larger and more difficult to assemble and handle.

SUMMARY OF THE INVENTION

The present invention involves an arrangement and configuration of main support pedestal panels and remaining housing panels which make provisions for the difference in height between the hot and cold end center sections such that the connecting plate duct assemblies on both the hot and cold ends are the same height. Specifically, the sides of the support pedestal panels are extended by an amount equal to the difference between the height of the hot and cold end center sections. The remaining housing panels are then extended or increased in height by an equal amount.

DESCRIPTION OF THE PREFERRED EMBODIMENT

Figure 1:
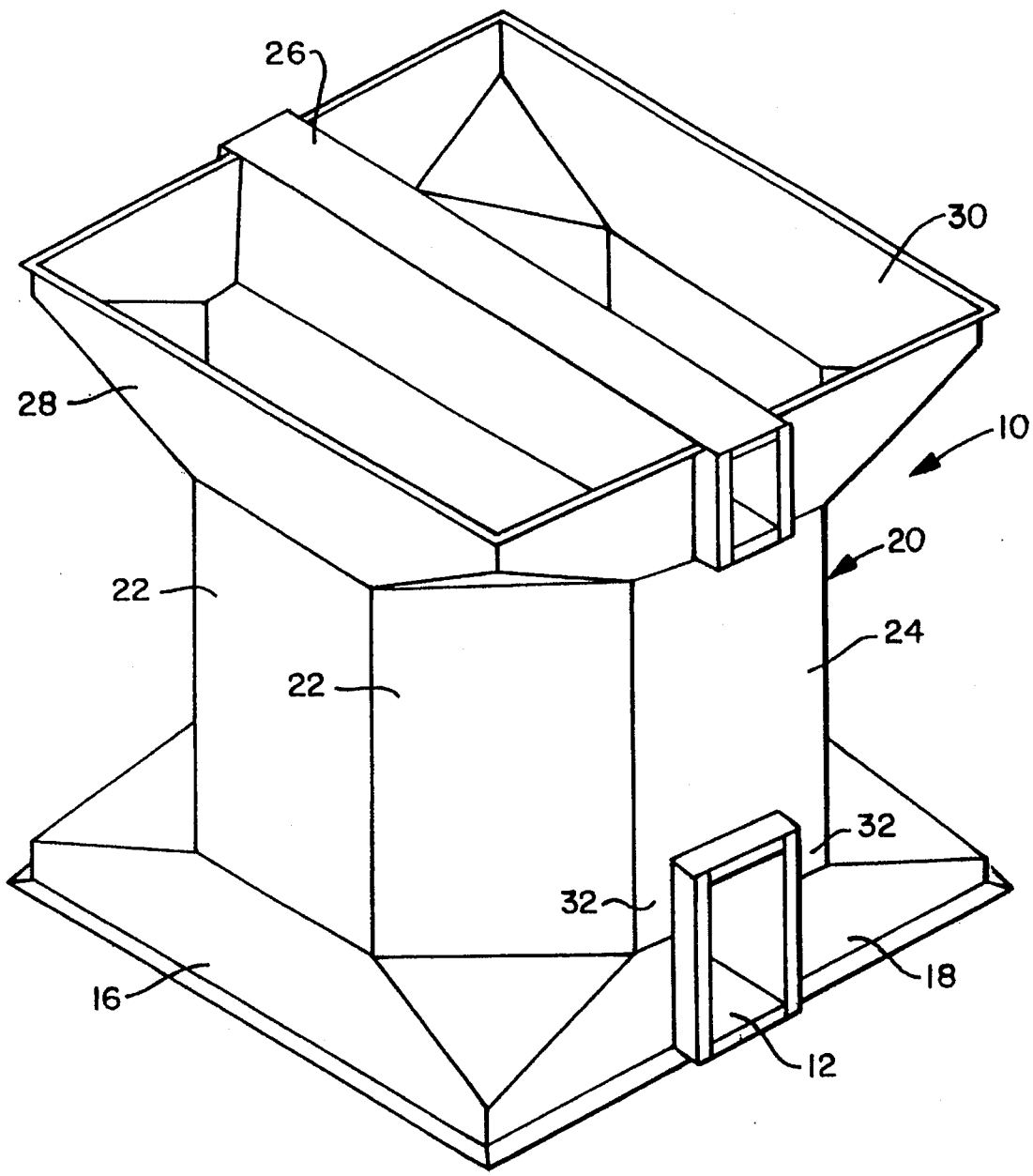
FIG. 1 is a perspective view of a rotary regenerative air preheater with portions broken away illustrating the present invention.

FIG. 1 of the drawings illustrates the basic structure of a rotary regenerative air preheater 10 constructed in accordance with the present invention. Forming the base unit is the cold end center section 12 which is also illustrated full length in FIG. 2. This cold end center section (as well as the hot end center section described hereinafter) is constructed in the conventional manner known in the art and comprises structural steel support beams and the associated support members (all of which are not shown in detail) to form the main support frame.

Figure 2:
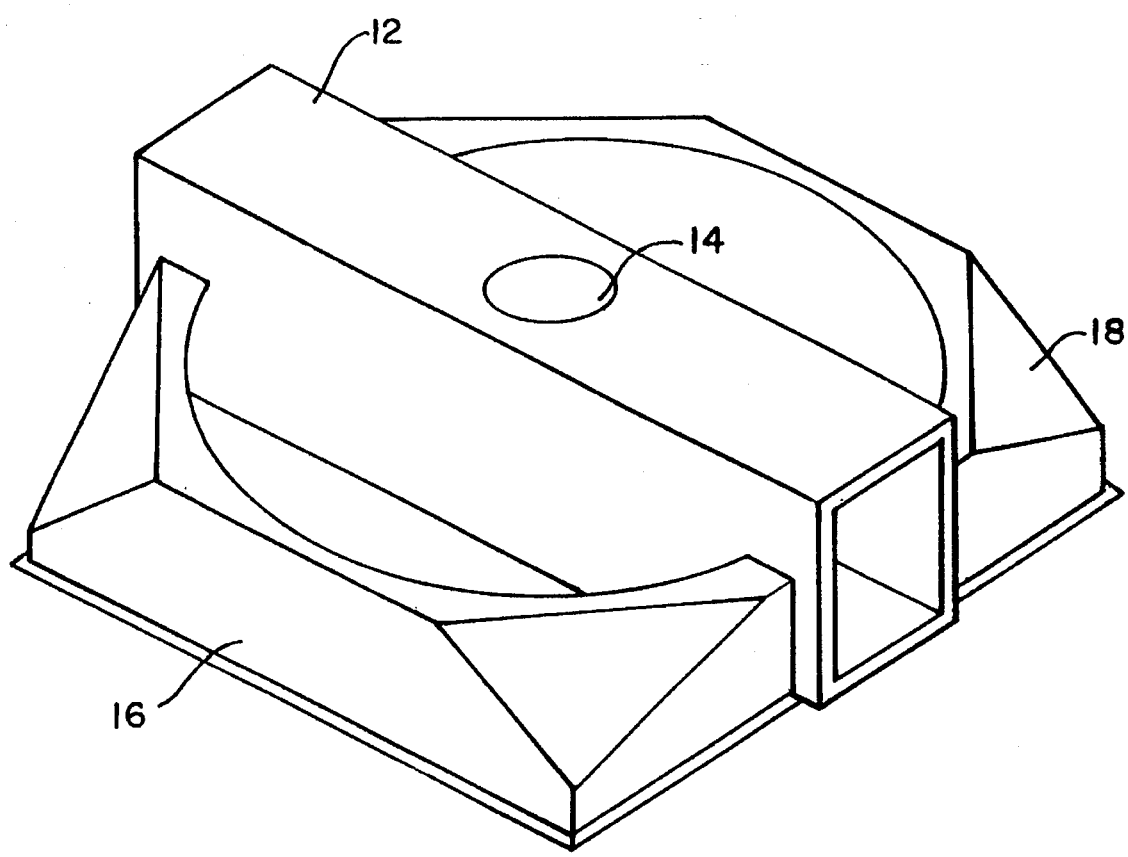
FIG. 2 is a perspective view of the cold end center section with the cold end connecting plate duct assemblies attached.

The rotor of the air preheater (not shown), is supported on the cold end center section 12 through the hole 14 shown in FIG. 2. The rotor may be as large as 65 feet in diameter and, 10 feet high and is tightly packed with heat exchange surface. Therefore, the rotor is extremely heavy which is the reason that a rigid cold end center section having considerable height is required.

Mounted on the sides of the cold end center section are the cold end connecting plate duct assemblies 16 and 18. As previously indicated, these form the connections and the transition between the duct work of the steam generator system and the generally circular housing of the air preheater. As can be seen, each of these connecting plate duct assemblies provides a rectangular end for connection to the duct work and is then "tapered down" to match the air preheater housing. According to the present invention as will be more fully explained hereinafter, these connecting plate duct assemblies 16 and 18 do not extend the full height of the cold end center section as was done in the prior art.

Mounted on and extending upwardly from the cold end connecting plate duct assemblies and from the cold end center section is the rotor housing 20. This rotor housing 20 is formed from the individual housing panels 22 and the two main support pedestal panels 24. In the illustrated embodiment, there are six housing panels 22 which, together with the two main support pedestal panels 24, make up the octagonal shaped housing 20. The housing panels 22 are longer (higher) than the panels in the prior art because of the shorter cold end connecting plate duct assemblies 16 and 18.

Extending across the upper, hot end of the air preheater 10 is the hot end center section 26 which is parallel to the cold end center section 12. The hot end center section 26 is supported at its ends by the two main support pedestal panels 24 which are attached to and supported by the ends of the cold end center section 12.

The hot end center section 26 functions as the mounting means for the upper end of the rotor shaft and, since it is not supporting the weight of the rotor, it is considered smaller (less height) than the cold end center section 12.

Figure 3:
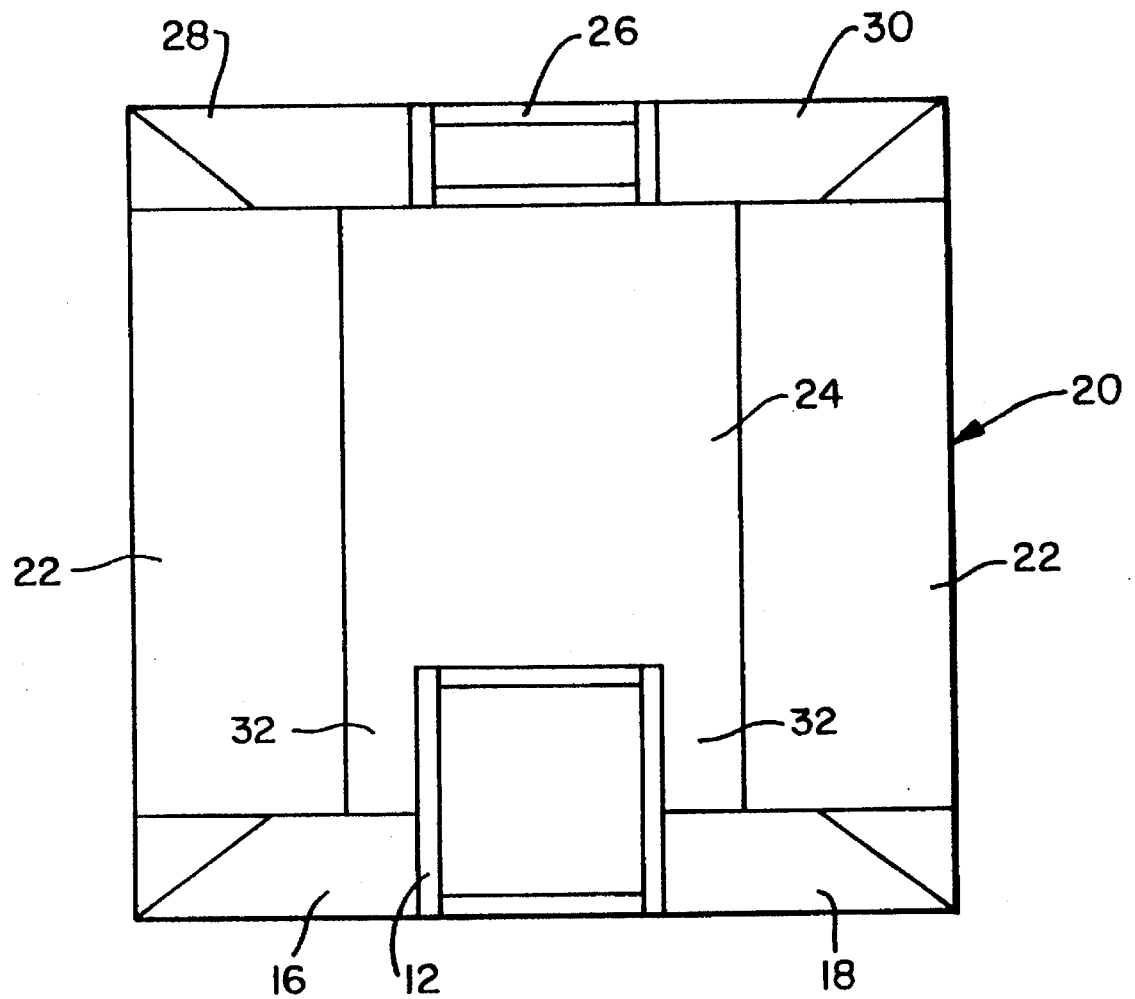
FIG. 3 is a side view of the air preheater of FIG. 1 particularly illustrating the hot and cold end center sections and one of the main support pedestal panels.

Mounted on the sides of the hot end center section 26 are the hot end connecting plate duct assemblies 28 and 30. Like the cold end connecting plate duct assemblies 16 and 18, these form the connections and the transition between the duct work and the air preheater housing 20. As can be seen in FIGS. 1 and 3, these hot end connecting plate duct assemblies 28 and 30 are substantially the same height as the hot end center section 26. The upper ends of the housing panels 22 and the support pedestal panels are connected to these hot end connecting plate duct assemblies.

According to the present invention, the height of the cold end connecting plate duct assemblies 16 and 18 is the same as the height of the hot end connecting plate duct assemblies 28 and 30. In this way, these parts are substantially identical thereby simplifying their design and manufacture. Also, the cold end connecting plate duct assemblies are much smaller and lighter than they would be according to the prior art where they were the same, height as the cold end center section.

In order to accommodate the difference in height between the cold end section 12 and the cold end connecting plate duct assemblies 16 and 18 according to the present invention, the main support pedestal panels 24 are specially constructed so as to fit around the cold end center section 12.

As can be seen in FIGS. 1 and 3, the sides of the support pedestal panels 24 are extended with offsets 32 equal in length to the difference between the height of the cold end center section and the height of the hot end center section.

I claim:

1. A rotary regenerative heat exchanger comprising a cold end center section having two sides and two ends and a selected height, a hot end center section parallel to and spaced above said cold end center section having two sides and two ends corresponding to said two ends of said cold end center section, a height less than said selected height, cold end connecting plate duct assemblies attached to said sides of said cold end center section having a height less than said selected height and substantially equal to said height of said hot end center section, hot end connecting plate duct assemblies attached to said sides of said hot end center section having a height equal to said height of said cold end connecting plate duct assemblies, housing panels forming a portion of a housing for said heat exchanger, said housing panels extending between and attached to said cold end connecting plate duct assemblies and said hot end connecting plate duct assemblies, and a main support pedestal panel located between each end of said cold end center section and said corresponding end of said hot end center section and supporting said hot end center section above said cold end center section, said main support pedestal panels including offsets which extend downwardly along said sides of said cold end center section a distance equal to the difference in the height of said cold end center section whereby said offsets extend downwardly to said cold end connecting plate duct assemblies and complete said housing for said heat exchanger.

* * * * *